Figure 1:
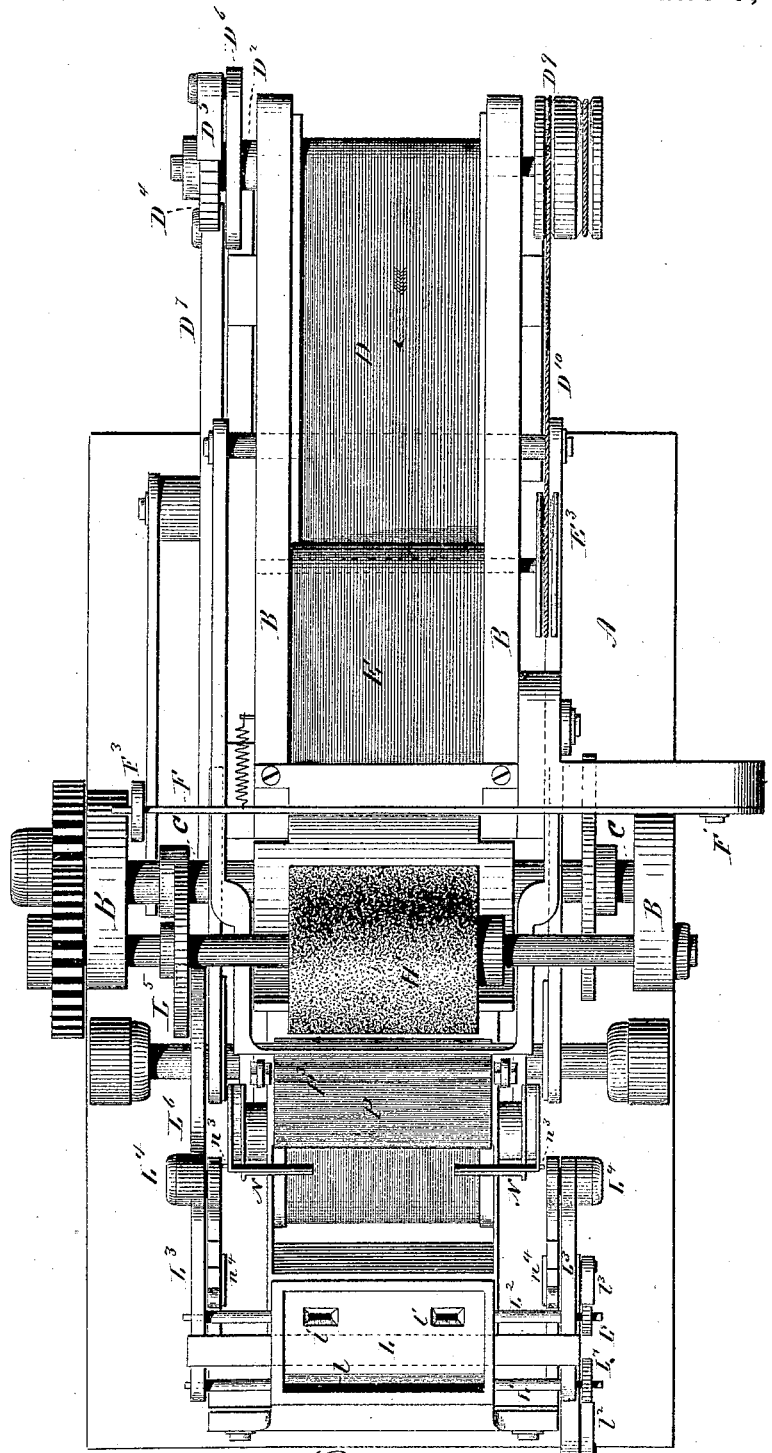

(Model.)

C. O. CROSBY, dec'd.
J. P. Crosby, Administrator.
Cigarette Machine.

No. 242,605.  Patented June 7, 1881.

Witnesses:
J. H. Shumway
L. D. Rogers

J. Parkman Crosby, Administrator of the Estate of
Chauncey O. Crosby, Inventor.
by atty Wm. E. Earle (Model.)
6 Sheets—Sheet 2.
C. O. CROSBY, dec'd.
J. P. Crosby, Administrator.
Cigarette Machine.
No. 242,605. Patented June 7, 1881.
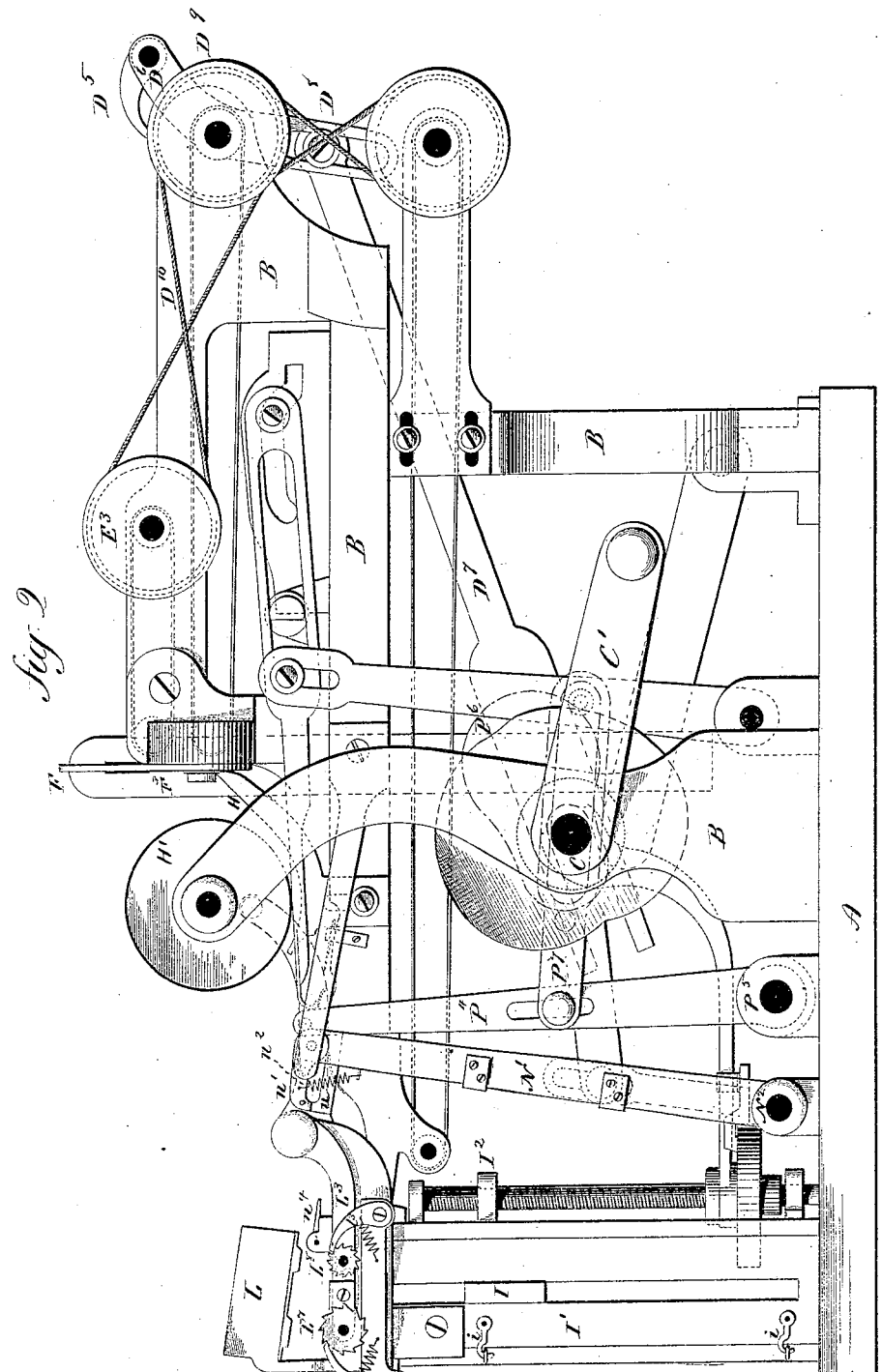

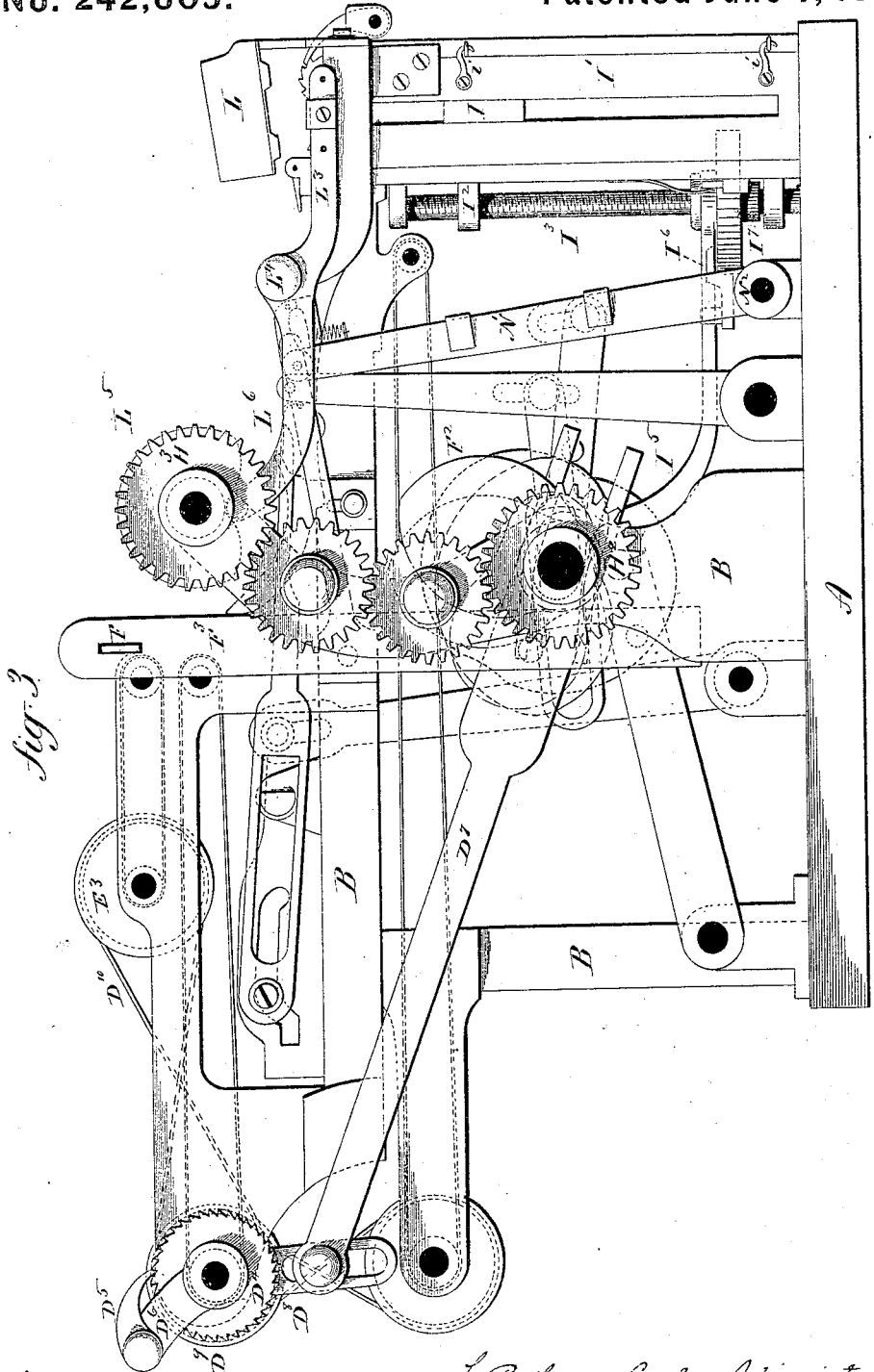

(Model.)
6 Sheets—Sheet 4.
C. O. CROSBY, dec'd.
J. P. CROSBY, Administrator.
Cigarette Machine.
No. 242,605. Patented June 7, 1881.
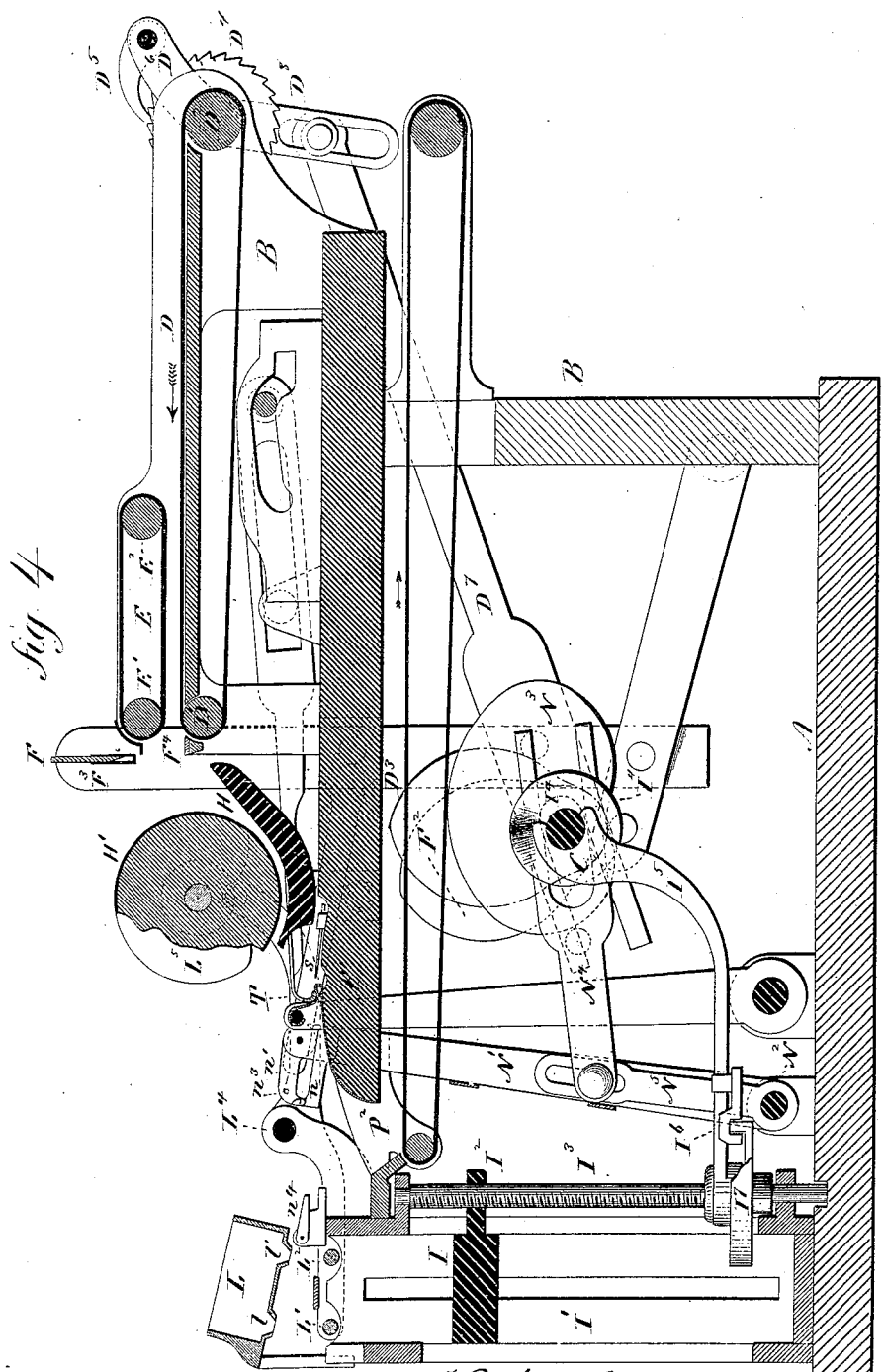
Witnesses:
J. H. Shumway
L. D. Rogers
J. Parkman Crosby, Administrator of the
Estate of Chauncey O. Crosby. Inventor
By atty:
John E. Earle (Model.)
6 Sheets—Sheet 5.
C. O. CROSBY, dec'd.
J. P. CROSBY, Administrator.
Cigarette Machine.
No. 242,605.
Patented June 7, 1881.
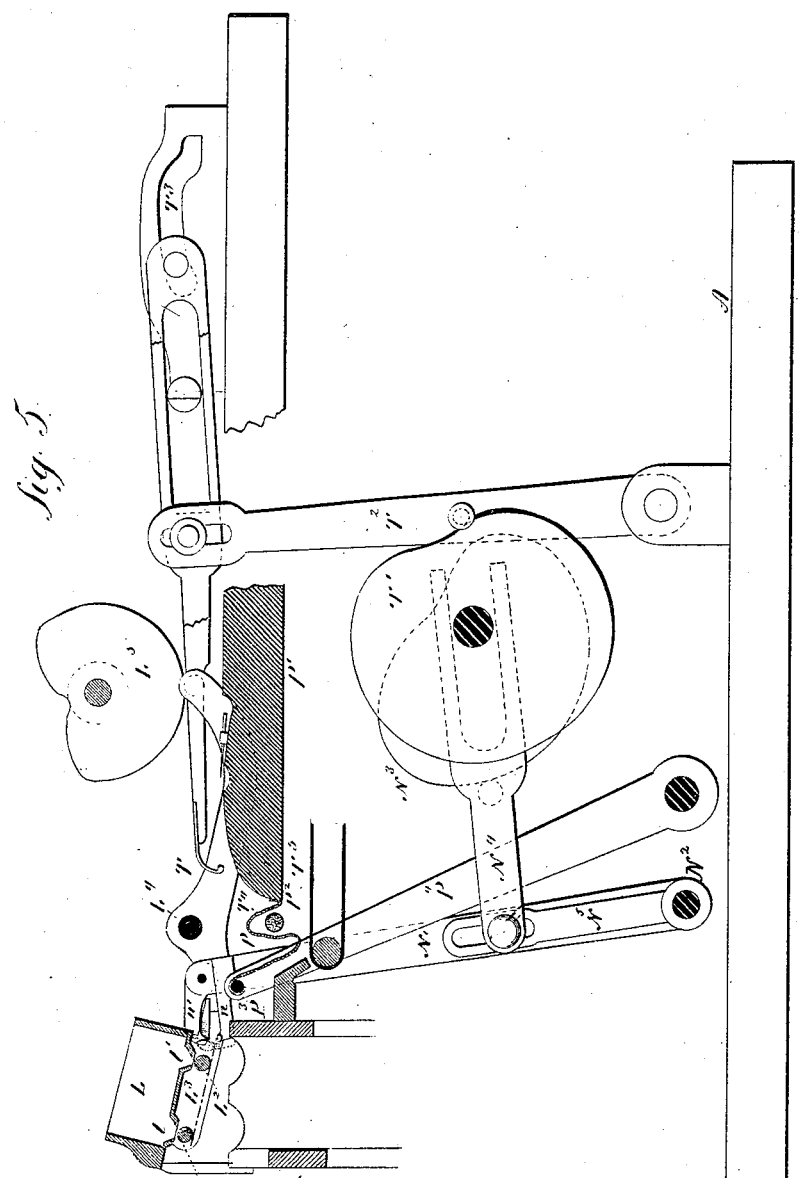

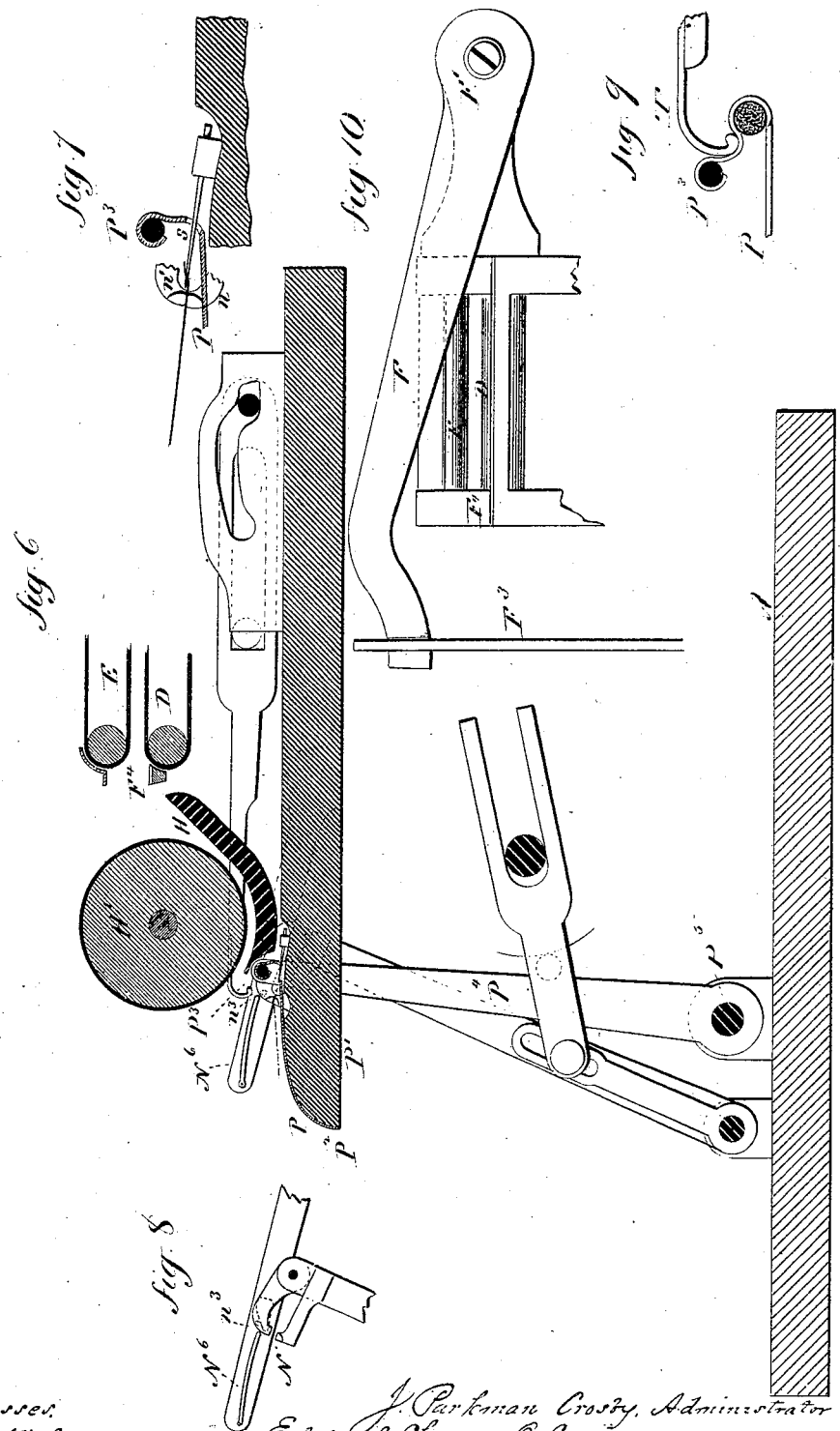

UNITED STATES PATENT OFFICE.

J. PARKMAN CROSBY, OF NEW YORK, N. Y., ADMINISTRATOR OF CHAUNCEY O. CROSBY, DECEASED, ASSIGNOR TO CHARLES A. TUTTLE, OF SAME PLACE.

CIGARETTE-MACHINE.

SPECIFICATION forming part of Letters Patent No. 242,605, dated June 7, 1881.

Application filed February 9, 1881. (Model.)

*To all whom it may concern:*

Be it known that CHAUNCEY O. CROSBY, deceased, late of Brooklyn, in the county of Kings and State of New York, did invent a new Machine for Making Cigarettes; and the following, when taken in connection with the accompanying drawings, and the letters of reference marked thereon, is declared to be a full, clear, and exact description of the same, and which said drawings constitute part of this specification, and represent, in—

Figure 1, a top view; Fig. 2, a right-hand-side view; Fig. 3, an opposite-side view; Fig. 4, a longitudinal section; Figs. 5, 6, 7, 8, 9, and 10, detached views.

This invention relates to an improvement in machines for making cigarettes, designed to receive, distribute the tobacco, and deliver the requisite quantity for a single cigarette to the sheet of paper which is to form the covering, then wrap the paper around the tobacco in substantially the manner practiced in rolling a cigarette by hand; and the invention consists in the combination of parts whereby the object is accomplished, as more fully hereinafter described, and particularly recited in the claims.

A represents the bed of the machine, and B B the frame upon which the operative parts are arranged; C, the driving-shaft, arranged in suitable bearings in the frame, and to which power is applied by means of a crank, C', or otherwise.

D is an endless apron mounted on rolls D' D², upon which the tobacco is spread from which the cigarette is to be made. An intermittent advancing movement in direction of the arrow, Fig. 4, is imparted to the apron by means of a cam, D³, operating upon a ratchet-wheel, D⁴, on the shaft of the roll D², through a pawl, D⁵, attached to a lever, D⁶, hung loosely upon the shaft of the roll D², and to which a connecting-rod, D⁷, is attached. The cam D³, acting directly upon the said connecting-rod, imparts an oscillating movement to the lever D⁶, and by which movement the pawl D⁵ communicates said movement to the endless apron D, the extent of such intermittent movement being adjustable by the connection between the rod D⁷ and the pawl-lever D⁶, the extent of this movement being such as to deliver the requisite quantity of tobacco, as more fully hereinafter described.

Above the endless apron, and at the forward end, is a second or auxiliary endless apron, E, arranged upon rolls E' E², the under run of the apron E being parallel with the upper run or surface of the apron D; and that the movement of the two aprons may be the same, power to move the apron D is applied directly from the shaft of the roll D² by means of a pulley, D⁹, from which a belt, D¹⁰, runs upon a pulley, E³, on the shaft of the roll E², as seen in Fig. 2.

The tobacco, having been cut and prepared in the usual manner for making cigarettes, is spread upon the apron D, whence it is carried beneath the apron E, which presses the tobacco into the form of a sheet of the required thickness, so that a piece cut from this rolled or pressed tobacco in width equal to its thickness will be sufficient for a single cigarette. The feeding of the tobacco, as before described, delivers it forward from between the two aprons, and when the requisite quantity has been delivered the feed stops. At that time a cutter, F, hung to one side, as at F', Fig. 1, and so as to work above the space between the aprons, is drawn down by the action of a cam, F², through a connecting-rod, F³. Below the tobacco, delivered as before described, is a stationary cutter, F⁴, (see Fig. 4,) and in such relative position to the cutter F that when the cutter F is drawn down it will act, in conjunction with the stationary cutter F⁴, as a pair of shears, and cut off the sheet of tobacco lying between them. The tobacco thus cut falls upon a table, H, which is inclined, so that the tobacco will slide or move down the table against a roll, H', to which a constant rotation is imparted by a train of gears, (seen in Fig. 3,) the lower gear, H², of the train being on the driving-shaft, and the upper, H³, on the shaft of the roll H'. The table H extends beneath the roll, and that portion of it beneath the roll is curved concentric to the roll, as seen in Fig. 4, and so as to leave a space between the roll and table equal to the diameter of the roll of tobacco required for a cigarette. The surface of the roll H' is preferably roughened, as by sanding or covering with sandpaper, or by applying to it a rough fabric, as woolen cloth, or may be chamois-skin, while the surface of the table is smooth. The tobacco, or "strip of tobacco," as it may be called, falls down upon the table and against the roll, and is taken by the roll into the space between it and the table. This causes a rotation of the strip of tobacco and rolls it along until it passes beyond its contact with the roll. Thus the roll H' delivers the tobacco rolled in proper shape and size for a cigarette.

While the forming of the tobacco into proper shape has been going on the paper has been presented to receive the prepared tobacco.

The papers to form the wrappers are cut to the required size and placed one upon another upon a horizontal platen, I. This platen is arranged in a vertical box, I', which may be opened for the insertion of the papers, the cover or door secured by hooks $i$, or otherwise. From the platen an arm, $I^2$, extends rearward, as seen in Figs. 2 and 4, through which works a vertical feeding-screw, $I^3$, so that the rotation of the screw imparts a corresponding vertical movement to the platen I. To the screw $I^3$ an intermittent rotating movement is imparted by a cam, $I^4$, through a lever, $I^5$, and a pawl, $I^6$, working upon a wheel, $I^7$, substantially a ratchet-feed, but here represented as a well-known frictional substitute for a ratchet-wheel. This movement of the screw $I^3$ raises the platen so as to press the papers thereon upward.

Above the column of papers is a hopper, L, which is supplied with paste or other adhesive material. Through its bottom is a long opening, $l$, at the forward edge, and at the rear two smaller openings, $l'$, (see Figs. 1 and 4,) through which the paste may be reached from the under side of the hopper. Below these openings a pair of rolls, L' $L^2$, are arranged upon one arm, $L^3$, of a lever hung upon a pivot, $L^4$, and in such relative position to the pivot $L^4$ that when that arm $L^3$ of the lever is turned upward it will bring the rolls L' $L^2$, respectively, to the openings $l$ $l'$, and, as shown in Fig. 5, so that the said rolls will come in contact with and receive a slight coating of paste. The rolls are thus forced upward by means of a cam, $L^5$, on the same shaft with the roll H', partially hidden in Fig. 4, (shown in broken lines Fig. 3,) operating upon the other arm, $L^6$, of the lever hung upon the pivot $L^4$. On the opposite side there is a similar lever, but only to the extent of the arm $L^3$, as seen in Figs. 1 and 2, which supports the other end of and moves with the paste-rolls L' $L^2$, so that they are moved always in a horizontal condition. After having received the paste the rolls L' $L^2$ are returned to the position seen in Fig. 4, and so as to strike the upper piece in the column of papers. Then when they again rise to the position seen in Fig. 5 they lift the first piece of paper from the column, it adhering to their under side the whole length of the roll L', which is at the forward or outer edge of the paper, and to the two pasted points on the other roll at the opposite edge. This holds the paper in the position seen in broken lines, Fig. 5, with its rear edge projecting beyond the roll $L^2$.

N N are two pairs of nippers, one jaw stationary, the other movable, not altogether unlike the nipper-jaws employed in printing-presses and other machines for taking hold the edge of a sheet of paper. Each pair of nippers is attached to a lever, N', hung at the bottom upon a rock-shaft, $N^2$, and so that the two levers will vibrate together. They are thus moved by means of a cam, $N^3$, through a lever, $N^4$, in connection with a lever, $N^5$, on said rock-shaft. (See Fig. 4.) The lower jaw, $n$, of the nippers is the stationary one, and the upper jaw, $n'$, is the movable or hinged one, and it is held down upon the stationary jaw by a spring, $n^2$, or otherwise. When the nippers are advanced, as in Fig. 5, to take the paper the upper jaw of each pair is raised, so that the lower passes below the paper and the upper jaw above the paper. This movement is produced by a stud, $n^3$, on the outside of the movable jaw, which strikes an incline, $n^4$, (see Figs. 1, 2, and 4,) which forces the movable jaw upward, and then as it advances it passes beyond the incline $n^4$, so that the stud drops off from that incline onto and so as to grasp the paper, and then when the nippers return with the paper the stud $n^3$ passes back beneath the incline $n^4$. That the backward movement may be free the inclines $n^4$ are pivoted as seen in Fig. 4, so that they rise as the stud $n^3$ comes upon their under side in its return. The paper thus taken by the nippers is carried back to near the mouth or delivery between the roll H' and the table beneath, as seen in Fig. 6.

P is the rolling-apron, which consists of a piece of flexible material, as leather or fabric, its front edge made fast to a bed, P', as at $P^2$, (see Figs. 4, 5, and 6,) its other edge made fast to a rod, $P^3$, attached at each end to a vertical lever, $P^4$, attached to a rock-shaft, $P^5$. A vibratory movement is imparted to the lever $P^4$ by means of a cam, $P^6$, working upon a rod, $P^7$, in connection with said levers $P^4$, and so that as the levers $P^4$ are carried backward they lay the apron P on the upper surface of the bed P', the rod $P^3$ falling back beneath the edge of the table H, as seen in Fig. 6. In this position stationary pins $s$ extend through corresponding perforations in the apron P, as seen in Figs. 6 and 7. Then when the nippers come back with the paper, as seen in Figs. 6 and 7, they carry the rear edge of it onto and so as to lightly engage it with those pins, as seen enlarged in Fig. 7, which shows the apron, paper, and table in their proper relative position, and in which position the roll H' delivers the tobacco onto the paper. As the nippers approach their extreme position for attaching the paper to the pins the studs $n^3$ pass beneath hinged inclines $N^6$, as seen in Fig. 6, raising the inclines until the studs $n^3$ pass from the inclines. Then the nippers returning the studs $n^3$ run onto the top of the inclines, so as to instantly open the nippers and free the paper, so that the paper remains in engagement with the pins s. The rod P³, which carries the end of the apron, now advances and carries the apron over the tobacco, as seen in Fig. 9, and as soon as the tobacco is covered a follower, T, arranged for the purpose, drops down upon the apron, as seen in Figs. 4 and 9 enlarged, bearing upon the apron forward of the tobacco, and riding thereon as the rod with the apron advances, thus causing the tobacco to roll in the apron, and the paper on the apron to escape from the pins s and wind around the tobacco until the edge of the paper is reached, and the paste thereon causes the outer edge to adhere to the surface and complete the cigarette.

The follower T is caused to move with the apron by means of a cam, T', operating upon a lever, T², to which the follower is hung, said cam T' acting to force the lever T² in one direction, and a spring (not shown) acting to return the lever, the requisite pressure and movement for the follower to drop upon the apron at the beginning and leave it when the cigarette is completed being produced by a groove, T³, of irregular form, as seen in Fig. 5. When the cigarette has been completed the apron passes on and away from the bed P, (see Fig. 5,) discharging the cigarette T⁴, which falls onto a carrying-apron, T⁵, below, and by that apron is delivered from the machine. The paper is readily forced from the pins s s as the rolling commences, the holding power of the pins being produced by roughening their surface, or may be simply a barbed point.

As the rolls L' L² present their upper surface to the openings in the paste-hopper and their under surface to the paper, it is necessary to cause the rolls to revolve so that the pasted surface may come to the paper. For this purpose I apply a ratchet, L⁷, to the shaft of the roll L', and a similar ratchet, L⁸, to the shaft of the roll L², as seen in Figs. 1 and 2, and arrange corresponding stationary pawls l² l³, which permit the rolls to be raised freely; but as they return the pawls strike into the teeth of the ratchets and cause them to revolve, so that at each movement up and down the said rolls are rotated, bringing fresh pasted surfaces to the paper at each operation. The roll L', as before stated, receives paste through the long opening l, which is the full length of the paper wrapper, and when the paper is drawn from the rolls by the nippers the roll L' has left sufficient paste on the surface of the paper to secure it when wrapped around the cigarette.

Instead of furnishing the wrappers to the machine cut to the required size, they may be taken from a roll of paper and each wrapper cut as it is wanted, the paste being applied in substantially the same manner as hereinbefore described. In that case the platen and its moving mechanism may be dispensed with.

It will be readily understood that instead of the endless aprons D and E other intermittent and automatic feeds may be applied; but I prefer the aprons, because the lower apron affords convenient facility for spreading the tobacco; but I do not wish to be understood as limiting this invention to the apron or aprons as the intermittent feed.

The intermittent feed-roll and table may be used as a separate device to prepare the tobacco.

The paste may be applied to the wrapper after its presentation upon the apron, if preferred.

What is claimed is—

1. The combination of a stationary table and revolving roll, operating together to roll the tobacco into shape to be wrapped, with an apron to receive the wrapper, and a follower operating to close upon said apron in advance of the tobacco, substantially as described.

2. The combination of a stationary table and revolving roll, operating together to roll the tobacco into shape to be wrapped, an apron to receive the wrapper, nippers to take the inner edge of the wrapper and present it in position upon said apron, with a follower operating to close upon said apron in advance of the tobacco, substantially as and for the purpose described.

3. The combination of a stationary table and revolving roll, operating together to roll the tobacco into shape to be wrapped, an apron to receive the wrapper, nippers to take the inner edge of the wrapper and present it in position upon said apron, a follower operating to close upon said apron in advance of the tobacco, and a device to paste the outer edge of the wrapper, substantially as described.

4. The combination of a stationary table and revolving roll to roll and present the tobacco, an apron to receive the tobacco and wrapper, a follower operating to close upon said apron in advance of the tobacco, the rolls L' L², and paste-hopper L, with openings through its bottom, to which said rolls are presented to receive the paste, and nippers to take the paper, substantially as described.

5. The combination of a stationary table, a revolving roll to roll and present the tobacco, an apron to receive the tobacco and wrapper, a follower operating to close upon said apron in advance of the tobacco, the platen I, to support a column of wrappers, and having an intermittent raising movement imparted to it, the rolls L' L², and paste-hopper L, with openings through the bottom, to which said rolls are presented to receive the paste, then dropped upon the upper wrapper in the column to take and raise said wrapper therefrom, and nippers to take the said wrapper from the rolls and deliver it to the apron, substantially as described.

J. PARKMAN CROSBY,
*As administrator of estate of Chauncey O. Crosby, deceased.*

Witnesses:
W. J. OSBORNE,
WM. A. WRIGHT.